(12) United States Patent
Brown et al.

(10) Patent No.: US 9,372,974 B2
(45) Date of Patent: Jun. 21, 2016

(54) CAPTCHA CHALLENGE INCORPORATING OBFUSCATED CHARACTERS

(71) Applicant: International Business Machines Corporation, Armonk, NY (US)

(72) Inventors: Michael S. Brown, Wahroonga (AU); Carlos F. Franca da Fonseca, Ermington (AU); Neil I. Readshaw, Parkwood (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/976,193

(22) Filed: Dec. 21, 2015

(65) Prior Publication Data

US 2016/0103983 A1 Apr. 14, 2016

Related U.S. Application Data

(63) Continuation of application No. 14/304,197, filed on Jun. 13, 2014.

(51) Int. Cl.
*G06F 17/00* (2006.01)
*G06F 21/31* (2013.01)

(52) U.S. Cl.
CPC ...... *G06F 21/316* (2013.01); *G06F 2221/2133* (2013.01)

(58) Field of Classification Search
None
See application file for complete search history.

(56) References Cited

U.S. PATENT DOCUMENTS

| 7,624,277 | B1* | 11/2009 | Simard | G06F 21/31 |
| | | | | 704/270 |
| 8,494,854 | B2 | 7/2013 | Gross | |
| 9,075,977 | B2* | 7/2015 | Gross | G10L 17/26 |
| 9,075,983 | B2* | 7/2015 | Foote | G06F 21/31 |

(Continued)

FOREIGN PATENT DOCUMENTS

| WO | 2012107879 A2 | 8/2012 |
| WO | 2012161713 A1 | 11/2012 |

OTHER PUBLICATIONS

Thomas, et al., "Method and System for Generating Unbreakable CAPTCHA", An IP.com Prior Art Database Technical Disclosure, IP.com No. IPCOM000233861D, IP.com Electronic Publication: Dec. 24, 2013, Copyright Yahoo! 2013.

(Continued)

*Primary Examiner* — Keith Bloomquist
(74) *Attorney, Agent, or Firm* — Daniel R. Simek

(57) ABSTRACT

A method for determining if a user of a computer system is a human. A processor receives an indication that a computer security program is needed and acquires at least one image depicting a first string of characters including at least a first and second set of one or more characters. A processor assigns a substitute character to be used as input for each of the second set of one or more characters. A processor presents the at least one image and an indication of the substitute character and when to use the substitute character to the user. A processor receives a second string of characters from the user. A processor determines whether the second string of characters substantially matches the first string of characters based on the substitute character assigned to each of the second set of one or more characters and determines whether the user is a human.

1 Claim, 4 Drawing Sheets

(56) References Cited

U.S. PATENT DOCUMENTS

| | | | | |
|---|---|---|---|---|
| 2009/0249476 | A1* | 10/2009 | Seacat | G06F 21/31 726/17 |
| 2011/0029902 | A1* | 2/2011 | Bailey | G06F 21/36 715/764 |
| 2011/0209076 | A1* | 8/2011 | Saxena | G06F 21/36 715/764 |
| 2012/0246737 | A1* | 9/2012 | Paxton | G06F 21/316 726/27 |
| 2012/0260108 | A1* | 10/2012 | Lee | G06F 21/6218 713/191 |
| 2012/0291108 | A1* | 11/2012 | Talamo | H04L 9/3273 726/6 |
| 2013/0276125 | A1* | 10/2013 | Bailey | H04L 63/1433 726/25 |
| 2015/0193631 | A1* | 7/2015 | Adams | G06F 21/62 726/30 |
| 2015/0269387 | A1* | 9/2015 | Cannarsa | G06F 21/62 726/30 |

OTHER PUBLICATIONS

List of IBM Patents or Patent Applications Treated as Related, Appendix P, Filed Feb. 29, 2016, 2 pages.

Michael S. Brown, et al., "CAPTCHA Challenge Incorporating Obfuscated Characters", U.S. Appl. No. 14/304,197, filed Jun. 13, 2014.

List of IBM Patents or Patent Applications Treated as Related, Appendix P, Filed Mar. 9, 2016.

Brown, et al., "CAPTCHA Challenge Incorporating Obfuscated Characters", U.S. Appl. No. 14/304,197, filed Jun. 13, 2014.

Brown, et al., "CAPTCHA Challenge Incorporating Obfuscated Characters", U.S. Appl. No. 15/064,708, filed Mar. 9, 2016.

* cited by examiner

CAPTCHA CHALLENGE INCORPORATING OBFUSCATED CHARACTERS

BACKGROUND OF THE INVENTION

The present invention relates generally to the field of information security, and more particularly to a Completely Automated Public Turing Test to Tell Computers and Humans Apart (CAPTCHA) program for authenticating an interaction occurring with a human and denying access to another computer or a software robot.

A CAPTCHA is a program that protects Websites against automated programs (bots) by generating and grading tests that humans can pass, but computer programs either cannot pass or have difficulty passing. One common implementation is a CAPTCHA comprised of one or more ordered strings of characters, sometimes separated by a space, represented within one or more images. Within the one or more images, the characters may be manipulated using various methods to distort the appearance of the characters. Humans may be able to read, or otherwise recognize, such distorted characters, but a computer program may not. In such an implementation, a user's response is typically an ordered string of characters that, when received, are tested for matches on a one-for-one basis to the CAPTCHA characters.

A CAPTCHA is sometimes referred to as a reverse Turing test, as it is the computer testing a human and not the other way around. A CAPTCHA oftentimes acts as a security mechanism by requiring a correct answer to a question, which, theoretically, only a human can answer better than a random guess. CAPTCHA's are useful for several applications, including: preventing comment spam in blogs, protecting Website registration, protecting e-mail addresses from Web scrapers, preventing on-line polls from being biased by responses from non-human sources, preventing dictionary attacks on password systems, and even preventing worms and spam in e-mail.

SUMMARY

Embodiments of the present invention disclose a method, computer program product, and system for determining if a user of a computer system is a human. A processor receives an indication that a computer security program is needed. In response, a processor acquires at least one image depicting a first string of characters including at least a first set of one or more characters and a second set of one or more characters. The processor assigns a first substitute character to be used as input for each of the second set of one or more characters, wherein the first substitute character is a different character than any of the second set of one or more characters. The processor presents the at least one image, an indication of the first substitute character and an indication of when to use the first substitute character to the user. The processor receives a second string of characters from the user. The processor determines whether the second string of characters substantially matches, within a predetermined threshold, the first string of characters based on the first substitute character assigned to each of the second set of one or more characters. The processor determines whether the user is a human.

DETAILED DESCRIPTION

Figure 1:
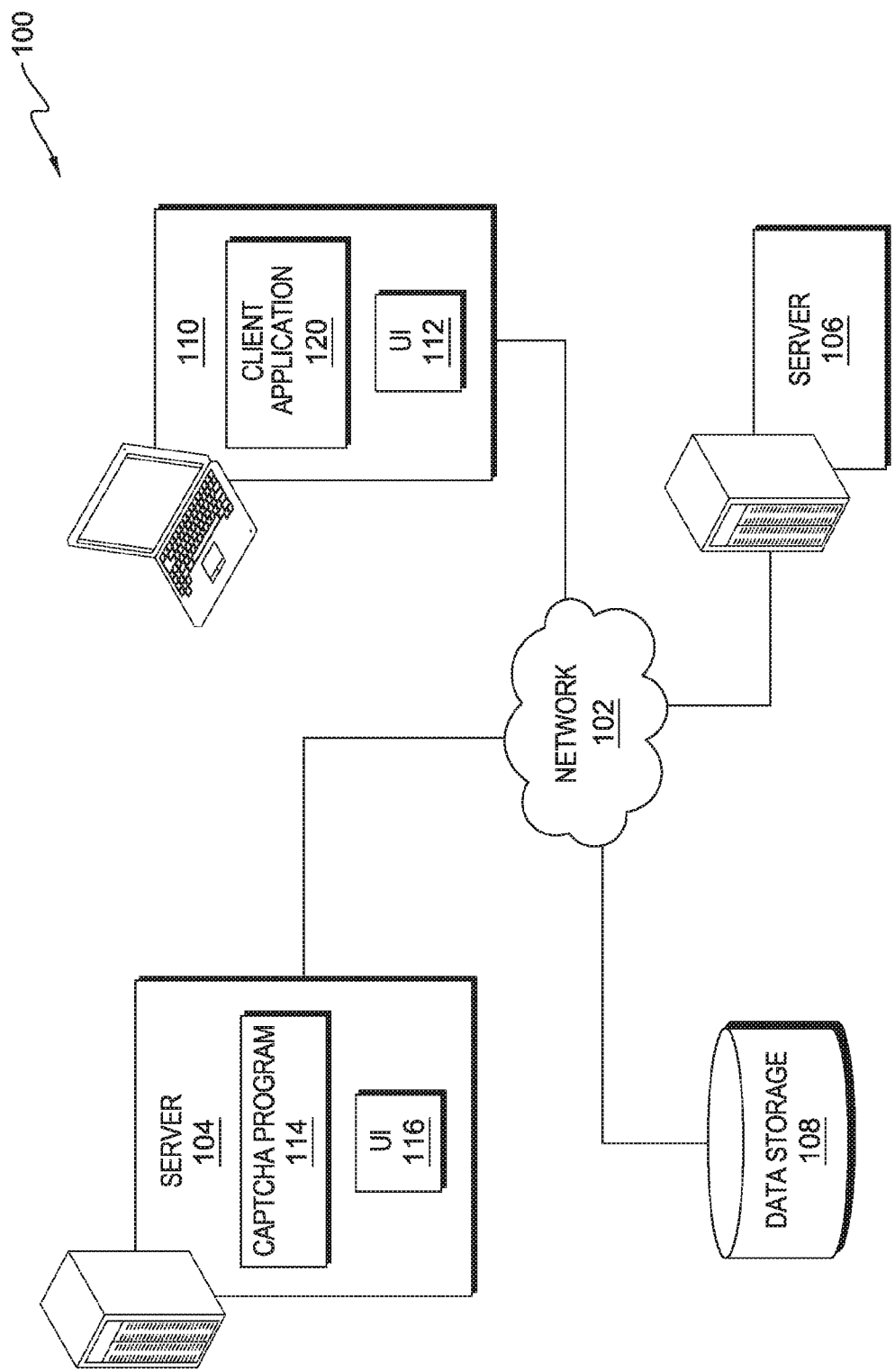
FIG. 1 depicts an illustrative diagram of a distributed data processing environment, in accordance with an embodiment of the present invention.

Various embodiments, in accordance with the present invention, recognize that recent advances in machine vision systems and optical character recognition (OCR) technologies have allowed computers to more frequently defeat less sophisticated character-based Completely Automated Public Turing Test to Tell Computers and Humans Apart (CAPTCHA) schemes. Alteration techniques are oftentimes applied to character-based CAPTCHAs to deform or distort characters. Embodiments of the present invention incorporate one or more obfuscated characters within a CAPTCHA challenge and present the user with an indication that one or more substitute characters are required to answer the CAPTCHA. The indication describing which substitute character(s) replace each of one or more obfuscated characters in the user's response is a message presented separately or included in the CAPTCHA window. Similarly, advances in digital signal processing and voice recognition have allowed automated program to more frequently defeat less sophisticated audio CAPTCHA schemes. Various embodiments can also be applied to the creation and presentation of audio CAPTCHAs to combat automated programs using these advances in audio technology. Other embodiments may improve the accuracy of the response of humans to a CAPTCHA challenge or present new approaches to combat automated programs. In some embodiments, successful proof of humanity is based, at least in part, on successfully recognizing standard CAPTCHA characters and correctly identifying the obfuscated characters.

An embodiment employs rules to increase the degree of protection for a secured resource. Some rules can relate to the obfuscated characters incorporated within the CAPTCHA challenge and to the messages presented to the user describing which substitute character(s) are to be integrated within the user's response. The obfuscated characters, for example, can range in appearance from undistorted shapes, which appear to be comprised of multiple characters, to virtually shapeless blobs. The substitute character message can be, for example, a simple declaration such as, "Use '#' for . . . ". Examples of substitute character messages which require analysis by the user are, an answer to a mathematical word problem, "use the value of two cubed for . . . " or "use the symbol that makes numerical comparison true 10 ' ' 3=30 for . . . ". A further embodiment can incorporate multiple obfuscated characters within the CAPTCHA and one of the rules of the protected resource can employ a particular way to describe the message. The user may have the substitute character message presented in a separate pop-up window as a table with a description of how to use the table of substitute characters to respond to the CAPTCHA. Some embodiments are configured to produce both visual and audio CAPTCHAs.

In such embodiments, the CAPTCHA challenges can be visual, and the substitute character messages can be audio clips. These methods, as well as rules governing the calculations relative to the CAPTCHA response accuracy, can be used singly or in combination to satisfy the security concerns associated with the secured resource.

Other embodiments of this invention allow the user to change the language used to present the text or audio implementations of the CAPTCHA. Similarly, an embodiment of this invention may detect the type of input device, as well as the language preference, to tailor CAPTCHAs to the character set available from the input device; for example, if the user has an APL programming keyboard, the user can access to a larger group of non-alphanumeric symbols to use as substitute characters. Whereas a user with a touchscreen device may have a reduced set of characters with which to respond. Some computing devices have voice recognition capabilities, and a user may, in some cases, speak the response and have the spoken response converted to characters which can subsequently be used to answer the CAPTCHA.

FIG. 1 depicts a diagram of distributed data processing environment 100, in accordance with embodiments of the present invention. In the depicted embodiment, data processing environment 100 includes server 104, server 106, client computer 110, and data storage 108 interconnected over network 102. Data processing environment 100 contains network 102, which acts as a medium for providing communications links between various devices and computers connected together within the data processing environment. Network 102 may be a local area network (LAN), a wide area network (WAN) such as the Internet, any combination thereof, or any combination of connections and protocols that will support communications between server 104, server 106, client computer 110, and data storage 108, in accordance with embodiments of the invention. Network 102 may include connections, such as wired, wireless communication links, or fiber optic cables. Data processing environment 100 may include additional servers, client computers, displays, and other devices not shown.

Server 104 may be, for example, a server system such as a management server, a Web server, or any other electronic device or computing system capable of processing program instructions and receiving and transmitting data. In another embodiment, server 104 may represent a server system utilizing multiple computers as a server system, such as in a cloud computing environment. In certain embodiments, server 104 can represent a computer system utilizing clustered computers and components that act as a single pool of seamless resources when accessed through network 102, as is common in certain data centers with cloud computing applications. Server 104 may be a node in a distributed database management system. Server 104 includes an instance of CAPTCHA program 114 and user interface (UI) 116. In general, server 104 can be representative of any computing device or a combination of devices with access to CAPTCHA program 114 and is capable of executing CAPTCHA program 114. Server 104 may include components, as depicted and described in further detail with respect to FIG. 4.

Server 106 may be, for example, a server system such as a management server, a Web server, or any other electronic device or computing system capable of processing program instructions and receiving and transmitting data. In another embodiment, server 106 may represent a server system utilizing multiple computers as a server system, such as in a cloud computing environment. In some embodiments, server 106 hosts one or more secured resources which the user of client computer 110 can access after completing a CAPTCHA through CAPTCHA program 114. Server 106 may also contain third-party databases and analytic software (not shown) to monitor the requests for access to the one or more secured resources. Server 106 may include internal and external hardware components, as depicted and described in further detail with respect to FIG. 4.

Client computer 110 may be, for example, a client computer system such as a notebook, a laptop computer, a tablet computer, a handheld device or smart phone, a thin client, or any other electronic device or computing system capable of communicating with a server system, such as server 104, server 106, and/or accessing data storage 108 through network 102. In one embodiment, client computer 110 acts as a client to server 104. Client computer 110 may contain user interface (UI) 112 and client application 120. Client computer 110 may include components, as depicted and described in further detail with respect to FIG. 4.

Data storage 108 may be a repository that may be written and read by CAPTCHA program 114, client application 120, and/or a third-party analysis program. Data storage 108 comprises one or more of the following: secured data resources, CAPTCHA libraries, secured resource database, or user ID database. Data storage 108 may reside on a server or other computing device (not shown).

User interface (UI) 112 operates on client computer 110 to generate display signals corresponding to content, such as windows, menus, and icons, and to receive various forms of user input. In one embodiment, UI 112 comprises an interface to client application 120. UI 112 may display data received from client application 120. UI 112 may send input to client application 120. UI 112 may comprise one or more interfaces, such as an operating system interface and/or application interfaces. UI 112 may process and display received and selected image information, as well as accept data entry from a user. UI 112 may be, for example, a graphical user interface (GUI).

Client application 120 requests access to a secured resource via network 102. In response to the request for access from client application 120, server 104 activates CAPTCHA program 114. CAPTCHA program 114 initiates a CAPTCHA challenge, which is transmitted to client computer 110 and displayed within client application 120 via UI 112. The user inputs a response to the CAPTCHA via UI 112. Client application 120 transmits the user's response to CAPTCHA program 114 and awaits CAPTCHA program 114 analysis of the user's response to the CAPTCHA. In some embodiments, if CAPTCHA program 114 identifies the user at client application 120 as a human, then CAPTCHA program 114 grants client application 120 access to the secured resource. If the CAPTCHA program 114 is unsure of the user's nature, then another CAPTCHA challenge is transmitted to client computer 110. If CAPTCHA program 114 decides that the user is not human, the CAPTCHA program 114 transmits a lock out indication to client application 120.

UI 116 on server 104 generates display signals corresponding to content, such as windows, menus, and icons, and receives various forms of user input. In one embodiment, UI 116 comprises an interface which allows a system administrator to monitor which secured resources are accessed and the frequency of the attempts to access secured resources. If a system administrator detects suspicious activity, then the system administrator can update CAPTCHA program 114 security rules to increase the CAPTCHA challenge difficulty, block access from specific user ID's or IP addresses, or take a secured resource off line. In another embodiment, a system administrator may, for example, create CAPTCHA rules for new secured resources, do statistical analysis of CAPTCHA characters' failure rates, or modify a substitute character library which CAPTCHA program 114 accesses. In one embodiment, UI 116 displays data received from CAPTCHA program 114. UI 116 can also send received input to CAPTCHA program 114. UI 116 may comprise one or more interfaces, such as an operating system interface and/or application interfaces. In some embodiments, UI 116 is a Web user interface (WUI). A WUI receives input and transmits output (such as selected image information) by generating Web pages which are transmitted via the Internet (such as network 102) and viewed by the user (e.g., at client computer 110) using a Web browser program (not shown).

CAPTCHA program 114 secures a computer resource, such as a database (e.g., data storage 108), application, or some other program by only allowing access to the computer resource when CAPTCHA program 114 determines that a user trying to access the secured resource is a human. CAPTCHA program 114 transmits the CAPTCHA image(s) to client computer 110 and receives a response from the client computer. In some embodiments, CAPTCHA program 114 may transmit animated images and/or audio messages to client computer 110, rather than one or more static images. CAPTCHA program 114 uses the received response to determine whether or not to allow access to the secured resource.

In one embodiment, server 104 includes an instance of CAPTCHA program 114. In such an embodiment, CAPTCHA program 114 may be a Web-based program accessible to many client devices (e.g., client computer 110) attempting to access a secured resource via client application 120. In one embodiment, the secured resource resides on server 104. In another embodiment, the secured resource resides on server 106. In such an embodiment, server 106 can act as a relay between CAPTCHA program 114 and client computer 110 to determine if access to the secured resource on server 106 is granted to client application 120. In yet another embodiment, CAPTCHA program 114 resides on server 104 and dynamically creates CAPTCHA challenges as needed based on the security rules of the secured resource accessed.

In some embodiments, data gathered, generated, and/or maintained for use by CAPTCHA program 114 may be stored on server 104, data storage 108, or another computer system (not shown). Examples of the data used by CAPTCHA program 114 may include, but are not limited to, a list of suspect IP addresses, CAPTCHA characters restricted from use, CAPTCHA characters designed to "trap" automated programs, user ID's and the frequency of access attempts related to the ID's, and the name of resources attempting to be accessed.

Figure 2:
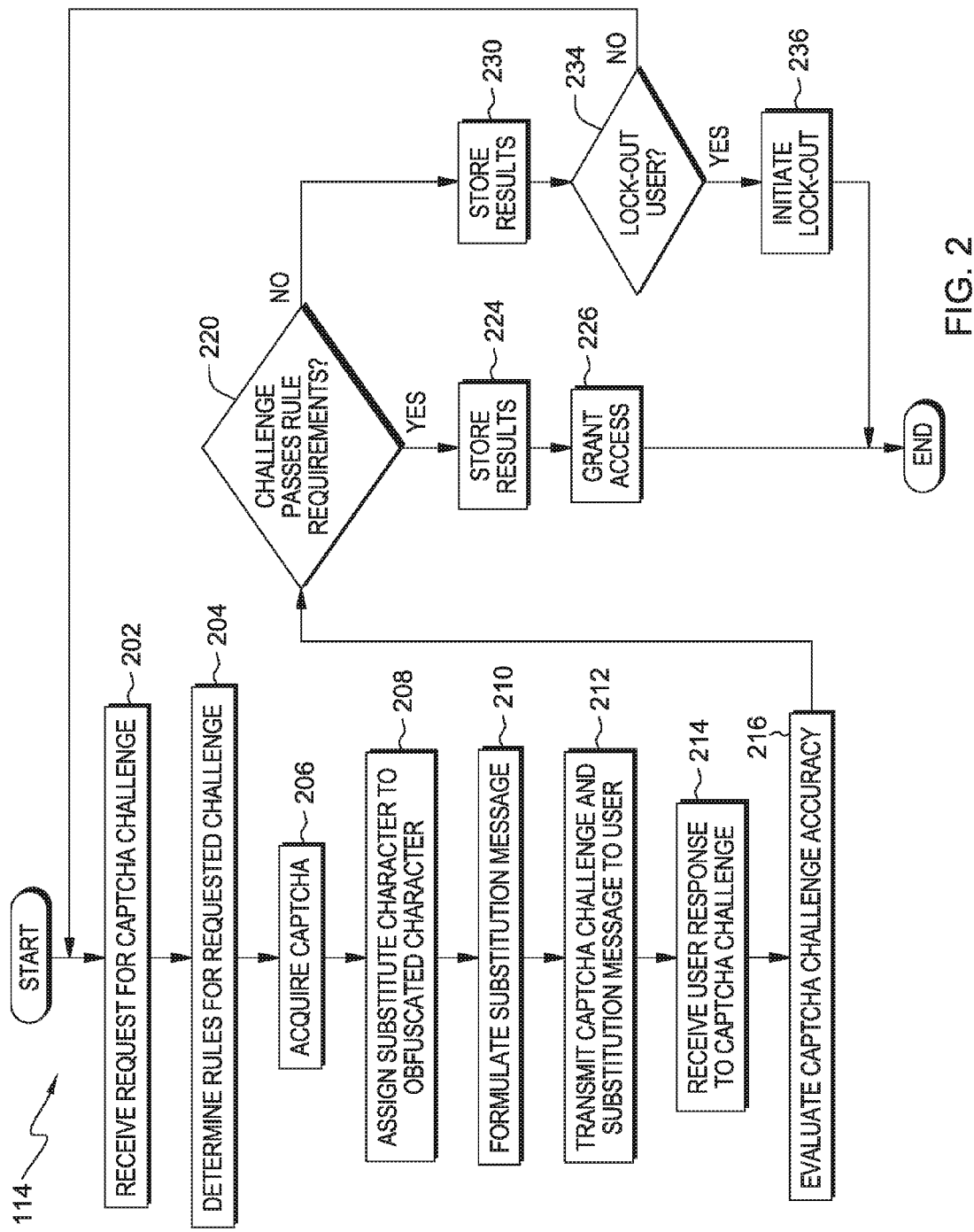
FIG. 2 is a flowchart depicting operational steps of a CAPTCHA program, in accordance with an embodiment of the present invention.

FIG. 2 depicts a flowchart of the steps of CAPTCHA program 114, executing within data processing environment 100 of FIG. 1, for determining if a user of a computer system is a human or an automated program, in accordance with an illustrative embodiment of the present invention. In one embodiment, server 104 receives a request to access a secured resource and passes the access control to CAPTCHA program 114 to initiate a CAPTCHA challenge. CAPTCHA program 114 analyzes the security rules associated with the secured resource and, in one embodiment, acquires a CAPTCHA based on one or more security rules from an external computing resource. In another embodiment, CAPTCHA program 114 generates a CAPTCHA incorporating the one or more security rules. CAPTCHA program 114 presents a CAPTCHA to a user, wherein the CAPTCHA includes one or more images depicting characters (e.g., alphabetic letters, numerical digits, punctuation marks, other graphemes, etc.), and at least one character, which is deliberately presented in an unfamiliar appearance (e.g., unreadable, illegible, obfuscated, ambiguous, etc.). "Obfuscated characters" is a non-inclusive, illustrative descriptor for characters, which are handled uniquely, based on the embodiments of the invention implemented. CAPTCHA program 114 integrates a message describing to the user the one or more characters to substitute for existing characters presented in an unfamiliar appearance in the presented CAPTCHA. CAPTCHA program 114 also compares received responses to the ordered description associated with the CAPTCHA using a variety of techniques and determines whether the user attempting to access the resource is a human or a computer.

In step 202, CAPTCHA program 114 receives a request for a CAPTCHA challenge in response to a user requesting access to, but not limited to, a resource. Information associated with the resource may require a CAPTCHA managed by CAPTCHA program 114 to determine whether the user is a human, a bot, or a computer program. In some embodiments, the request may further include rules indicating requirements for the CAPTCHA, threshold requirements for passing, or other information. In other embodiments, the CAPTCHA program monitors if the request for access is an initial request or is a subsequent attempt. If the access request is a subsequent attempt, a rule can define such that the difficulty of the CAPTCHA challenge increases based on the number of access attempts of a CAPTCHA managed by CAPTCHA program 114, successful or unsuccessful, from the same IP address. CAPTCHA program 114 may use other methods to determine if a higher difficulty challenge is required.

In step 204, CAPTCHA program 114 determines one or more rules for the CAPTCHA challenge. The one or more rules refer to, for example, a degree of difficulty of a particular CAPTCHA that is presented to a user in solving the CAPTCHA challenge, the number of obfuscated characters within a particular CAPTCHA, a particular way to describe the substitute character message to the user, a weight, or set of weights, to apply to one or more characters, types of characters (e.g., regular characters, obfuscated characters, etc.) and/or images within a particular CAPTCHA or a variety of other rules that may modify the level of security of the CAPTCHA. In one embodiment, CAPTCHA program 114 applies predetermined security requirements to a requested CAPTCHA based on the "importance" or "sensitivity" assigned to a secured resource. In another embodiment, the one or more rules are based on or linked to a specific secured resource. In a different embodiment, a rule is set to prioritize the accuracy comparisons to identify an automated program over a human user. In some embodiments, if CAPTCHA program 114 detects suspicious activity, or is notified of suspicious activity, for example by a security program (not shown), then CAPTCHA program 114 can apply more stringent security rules to acquire a more difficult challenge. An example of such activity may be multiple users seeking access to the same resource at the same time. In one embodiment, CAPTCHA program 114 determines the existence of such suspicious activity if there are repeated attempts of a CAPTCHA managed by CAPTCHA program 114, successful or unsuccessful, from the same IP address. CAPTCHA program 114 may use other methods to determine if a higher difficulty challenge is required.

In one embodiment, a rule prioritizes an accuracy comparison to identify automated programs over a human user. For example, an automated program can have a high accuracy rating for one comparison test for a CAPTCHA, but the automated program may also accurately identify characters which a human user can only guess at or respond to with a designated substitute character. Such an example, an animated CAPTCHA, is flashed at a high rate rather than incorporating physical movement of the characters, and a pair of characters are overlapped. In this example, the pair of characters is '6' and '9'. Alternately flashing the characters of the pair of characters at a high rate produces an appearance of a single distorted '8' to a human user. An automated program using OCR technology may identify the pair of characters correctly as '6' and '9'. In such a case, the human may have a lower accuracy for a direct match comparison. For example, if the predetermined thresholds were a range, a human may not be expected to produce a perfect response. Alternatively, in weighted comparison identifying the '6' and '9' at a specific position can result in a reduced accuracy comparison for the automated program.

In some embodiments, CAPTCHA program 114 utilizes a CAPTCHA that includes two or more groups of obfuscated characters with differing characteristics. In such an embodiment, each group can have a descriptor assigned which describes the characteristics of that group. In such an embodiment, each group may be assigned a substitute character for use in a manner similar to the previous description. Group characteristics can include factors such as character color, font, similarity to other characters (e.g., a capital I and a lower-case L can appear to be very similar characters, depending on the font used to produce the character), and/or other factors. Additional rules that affects changes to the substitute character message are the following, a rule associated with the one or more obfuscated characters presenting a plurality of substitute characters to be used by the users, and a rule used to modify security considerations governing the response to specific instances of the one or more obfuscated characters. In one embodiment, a substitute character message can describe rules governing the selection of substitute characters to be used in the CAPTCHA response.

In step 206, CAPTCHA program 114 acquires a CAPTCHA image. In some embodiments, rather than an image, CAPTCHA program 114 acquires multiple images, an animation, and/or audio message. In some embodiments, CAPTCHA program 114 can acquire the CAPTCHA image according to one or more rules associated with the request. In some embodiments, CAPTCHA program 114 may generate a CAPTCHA image. In such an embodiment, CAPTCHA program 114 may generate a CAPTCHA image using a variety of techniques. For example, CAPTCHA program 114 may select a random string of characters, insert at least one obfuscated character within the string of characters, and split the string into sub-strings based on the types of characters (e.g., regular CAPTCHA characters, obfuscated characters, etc.). CAPTCHA program 114 saves an ordered description of the characters comprising the strings and each character's location within the string. CAPTCHA program 114 may apply one or more alteration techniques to the sub-strings and without changing the order of the sub-strings converts the sub-strings into one or more images which are into a CAPTCHA. The CAPTCHA is assigned a unique identifier associating the CAPTCHA with the updated ordered description.

In other embodiments, CAPTCHA program 114 retrieves a CAPTCHA image, or CAPTCHA images, that include at least one obfuscated character from a repository containing a library of CAPTCHA images, such as storage device 108. Some embodiments of the invention allow for each of the one or more obfuscated characters to be in different images, such as when the particular CAPTCHA is composed of multiple images.

In one embodiment, CAPTCHA program 114 can further differentiate between two or more sets of one or more obfuscated characters by assigning a descriptor to, or otherwise annotating, each group of one or more obfuscated characters. Descriptors associated with each set of one or more obfuscated characters may be based, at least in part, on characteristics of each character of the set, such as whether the characters are "unreadable" or "ambiguous". For example, a descriptor can be assigned to a set of one or more characters indicating that each character in the set is "unreadable", such that each character is deliberately distorted beyond recognition or is an altered shape which was not based on a character.

Another descriptor can be assigned to a set of one or more characters, indicating that each character in the set is "ambiguous", wherein each character appears as though it can be two or more optionally selectable characters. A descriptor indicating that a set of one or more characters is ambiguous can, for example, be assigned to a character which is minimally distorted and appears as, but is not limited to, a character presented in an unknown font or language, a character which appears to be a combination of one or more characters or symbols, or a legible symbol which the user cannot create without the use of a special font, a program, or "hot-key" combination.

In another embodiment, the descriptor assigned to a group of characters may have a common definition. Examples of common descriptors include, but are not limited to, odd numbers, fractions, blue text, mathematical symbols, vowels, or geometric shapes.

In another embodiment, a set of obfuscated characters may be tailored to act as "traps" to, preferentially, identify automated programs and software bots. For example, a character using a dingbat font may be represented within an image of a CAPTCHA. A dingbat font is a font that has symbols and shapes in the positions designated for alphabetic or numeric characters. In such an embodiment, an automatic program or software bot can recognize the alphanumeric character corresponding to the dingbat font representation in the image and may be trapped into selecting a character not depicted in the substitute character message of a CAPTCHA image. In a different embodiment, two numbers that overlap may appear to the user as one number. For example, in a segmented font the number 1 butted up to a number 3 may appear as an '8' or a 'B' to a human, but an automated program may identify it as two characters '1' and '3'.

The various embodiments of the invention can be adapted to function with an animated CAPTCHA. An animated CAPTCHA may operate similarly, from the perspective of the user, to a CAPTCHA image. An animated CAPTCHA may include, for example, one or more moving characters, background images, or foreground images within the animation.

Alternate embodiments are compatible with an audio presentation of a CAPTCHA wherein, CAPTCHA program 114 identifies the one or more obfuscated character and/or any substitute characters with a sound or a noise. As with the visual embodiments of the invention, an audio clip corresponding to the obfuscated character can be assigned multiple substitute characters to increase degrees of complexity to impede automated programs using voice recognition software, signal processors, or other techniques. For example, a message may indicate that audio clips of a first sound, for example a dog barking, corresponds to a first substitute character, whereas audio clips of a second sound, for example a bell ringing in the same audio CAPTCHA, corresponds to a second substitute character.

In step 208, CAPTCHA program 114 assigns a substitute character to one or more obfuscated characters within the CAPTCHA. In an embodiment, CAPTCHA program 114 assigns a single substitute character to represent the one or more obfuscated characters for use in the user's suggested response. The one or more obfuscated characters may be the same, may be unique, or a combination thereof, in accordance with an embodiment of the invention. In another embodiment, CAPTCHA program 114 assigns multiple substitute characters to one or more obfuscated characters, or groups of one or more obfuscated characters, in the user response. In such an embodiment, CAPTCHA program 114 assigns substitute characters to each obfuscated character, or group of obfuscated characters, based on a particular characteristic, or shared characteristic within the group. For example, a substitute character may be assigned to one or more characters based on font, color, degree of obfuscation, or other factors. In yet another embodiment, CAPTCHA program 114 employs an associated rule (see step 204) governing the occurrence of one or more obfuscated characters, wherein the substitute character is based on the location of the obfuscated character within the string of characters. An example of such a rule is to use the '?' character for the first occurrence of the obfuscated characters and the '%' character for any subsequent occurrence of the obfuscated character. In another example, CAPTCHA program 114 presents the user with a substitute character definition based on the position of the obfuscated characters within the CAPTCHA, from left to right, (e.g., first position='!', second position='@', fifth position='%').

In step 210, CAPTCHA program 114 formulates a substitution message specifying how the user is to respond to the one or more obfuscated characters, based on the assigned substitute character(s). The substitution message may be represented by one or more indications. One embodiment of the invention formulates a different indication identifying the use of a single assigned substitute character. An indication within one or more embodiments of the invention includes, but is not limited to, a visual representation of a substitute character, a text description of how to input a substitute character, a usage message presented within the CAPTCHA image, an audio clip message, or a non-modal pop-up window. In general terms, indications provide the user with information most often in the form of a visual or an audio message. In some embodiments, the substitute character will be an alphanumeric character, punctuation mark, or other symbol accessible through the use of a keyboard. In other embodiments, the substitute character may be selectable within UI 112, such as a selectable button or other element within the CAPTCHA window. For example, if the assigned substitute character is '?', a message may be presented with the CAPTCHA that states "Use '?' for ambiguous or unclear characters". The '?' character is a non-inclusive illustrative example of a substitute character. The '?' used within the specification can be represented by a plurality of characters within the actual implementation of an embodiment of this invention. The assumption in this case is for the user to respond with a '?' for any occurrence of an obfuscated character. For users unfamiliar with this type of response to a CAPTCHA challenge, embodiments of this invention can present an aid to allow the users to access a "Help" screen where explanations of the terms and descriptors can be found. Examples of aids to access a Help screen include an icon, identified hot-key (e.g., 'F1' is a commonly used Help key), or a button. In one embodiment, a rule associated with the received request (see step 202) describes a particular way to obscure the meaning or presentation of the substitute character message or otherwise transmit and present the substitute character message to client computer 110. For example, if the substitute character is '?', CAPTCHA program 114 may present the message as "Use the keyboard combination 'shift /' for the obfuscated character(s)" or, alternatively, if the substitute character is '[', CAPTCHA program 114 may present the message as "Use the un-shifted symbol associated with the key to the right of the 'P' key for the obfuscated character(s)". CAPTCHA program 114 may further adjust and obscure presentation of the message, based on associated rules and assigned substitute characters, to create a message such as, "Use the symbol associated with the third odd number on the keyboard". In another embodiment, CAPTCHA program 114 produces a message identifying the substitute character based on answering a question or completing a mathematical equation. For example, CAPTCHA program 114 may produce a message stating "US currency symbol associated with paper money" that yields a substitute character of '$', or "Use the mathematical symbol which makes this equation true: 10 is (greater than (>) or less than (<) 20" that yields a substitute character of '<'. In some embodiments, messages and ways by which to present messages are stored in a repository, such as data storage 108. In some embodiments, a variety of predefined messages are associated with substitute characters Some embodiments of the invention can constrain the substitute character(s) chosen to allow for the formulation of the substitute character message such that the message structure can be translated into an audio clip.

In step 212, CAPTCHA program 114 transmits the CAPTCHA challenge and the substitute character message to the user via UI 112 and client application 120. In one embodiment, the substitute character message displays within the CAPTCHA challenge window. In other embodiments, a message identifying the substitute character can replace a visual representation of the message with an audio clip, triggering the substitute message to play for the user via a different method (e.g., button, icon). In some embodiments, an audio clip message for the substitute character may be presented to the user, such that the identity of the substitute character is obscured within the audio message. For example, an audio message may describe the input character, provide a series of two or more keystrokes on a keyboard that will result in the character being input, describe the location of the character within a standard QWERTY keyboard, or may otherwise obscure the message identifying the substitute character.

In some embodiments, CAPTCHA program 114 presents the substitute character message to the user in a separate window, such as a pop-up or modal window.

In step 214, CAPTCHA program 114 receives a user's response to the CAPTCHA challenge. In some embodiments, the user's response is an ordered selection of characters, or string of characters, corresponding to the ordered plurality of characters and the one or more obfuscated characters that make up the string of characters of the particular CAPTCHA challenge. In some embodiments, the user's response may be a selection of characters from a physical or virtual keyboard, such as a QWERTY keyboard. In other embodiments, the user's response may be a selection of images corresponding to the characters depicted within the CAPTCHA challenge.

In step 216, CAPTCHA program 114 evaluates the accuracy of the received response. In one embodiment, CAPTCHA program 114 compares the ordered selection of characters of the response to the ordered plurality of characters and the one or more obfuscated characters of the CAPTCHA. CAPTCHA program 114 evaluates the accuracy of the response. In some embodiments, CAPTCHA program 114 evaluates the accuracy of the response by analyzing the ordered selection of the characters of the response, the ordered plurality of characters, and the one or more obfuscated characters in relation to a predetermined threshold for accuracy defined within a rule associated with the received request for the CAPTCHA challenge (see step 204). In some embodiments, a rule associated with the received request (see step 204) may cause CAPTCHA program 114 to allow for some inaccuracies in the user's response. In other embodiments, a rule associated with the received request (see step 204) may cause CAPTCHA program 114 to allow minimal deviation from the expected answer. Various predetermined thresholds can be passed to CAPTCHA program 114 to be used as references for, but not limited to, an accuracy comparison or a weighting factor calculation.

In an embodiment, CAPTCHA program 114 employs weighting factors which can be applied to some or all of the characters within a CAPTCHA image to analyze the accuracy of a user's response. In some embodiments, CAPTCHA program 114 applies weighting factors to different sets of characters, such as sets of one or more characters with a single assigned descriptor. In some embodiments, CAPTCHA program 114 adjusts weighting factors based on, for example, security concerns for the location or other resource a user is attempting to access. An example of weighting factors are, for example, a weighting factor of 1 for each correctly identified character of the first set, a weighting factor of 0.5 for each correctly identified obfuscated character, and a weighting factor of −2 for each incorrect character used for a substitute character. In such an embodiment, a threshold may be specified by the received request, and CAPTCHA program 114 may apply the appropriate weighting, as specified by the received request, and compare the resulting number to the specified threshold to determine whether the received response passes or fails the particular CAPTCHA challenge.

In some embodiments, CAPTCHA program 114 reviews the rules determined at step 204, and in response to the review, prioritizes the results from the one or more accuracy comparisons analyzed in relation to the predetermined thresholds.

In another embodiment, CAPTCHA program 114 allows for non-standard characters, such as characters not usually located on a standard user's keyboard or characters not of the user's default language preference, as specified, for example, by the Web browser of the user accessing the CAPTCHA. Such characters or symbols can be difficult for an average user to reproduce and can act as a "trap" to detect that the user is an automated program or a "bot". In such an embodiment, CAPTCHA program 114 may use such a trap to determine that a user correctly selecting such a character is likely an automated program. In some embodiments, CAPTCHA program 114 may be programmed to lock out a user more quickly if they correctly select such a character. For example, CAPTCHA program 114 may determine that a CAPTCHA response containing a match to one non-standard character fails the requirements to pass the CAPTCHA challenge; however, CAPTCHA program 114 may also determine that a CAPTCHA response containing matches to more than one non-standard character will trigger an immediate lock out. CAPTCHA program 114 can enforce such a lock out by banning, for example, the IP address of the user from access attempts for a period of time.

In decision 220, CAPTCHA program 114 determines whether the user attempting to access the location or resource has passed the rule requirements of the CAPTCHA challenge, based on the evaluation of the accuracy of the received response to the CAPTCHA challenge, and rules associated with the CAPTCHA challenge request (see step 204). If CAPTCHA program 114 determines the user has passed the CAPTCHA challenge (yes branch, decision 220), the user is identified as human and CAPTCHA program 114 stores results of the CAPTCHA challenge (step 224).

In step 224, CAPTCHA program 114 stores one or more results of the CAPTCHA challenge for analysis. The one or more results may be stored on server 104, data storage 108, or any other computing or storage resource accessible by network 102. The one or more results include, but are not limited to, the CAPTCHA challenge presented to the user, the substitute character message, the obfuscated characters, the response from the user and corresponding expected response, identification information of the user, the user's IP address, and/or the identity of the resource or location accessed.

In step 226, CAPTCHA program 114 determines that the user is a human and, in the depicted embodiment, grants the user access to the secured resource.

If CAPTCHA program 114 determines that the CAPTCHA challenge requirements were not met (no branch, decision 220), CAPTCHA program 114 stores the one or more results of the CAPTCHA challenge for analysis (step 230). The one or more results may be stored on server 104, server 106, data storage 108, or any other computing or storage resource accessible by network 102. The one or more results include, but are not limited to, the CAPTCHA challenge presented to the user, the substitute character message, the obfuscated characters, the response from the user and corresponding expected response, identification information of the user, the user's IP address, and/or the identity of the resource or location the user is attempting to access. In some embodiments, images which are misidentified by a majority of users can be prevented from use in future CAPTCHAs. In other embodiments, subsequent analysis of data stored during step 224 and step 230 indicates that an image is consistently misidentified by a majority of users, for example 90+% of users determined to be human misidentify the image as 'P'. CAPTCHA program 114 modifies the image's identification to 'P' in future CAPTCHAs.

In decision 234, CAPTCHA program 114 determines whether the user is locked out from additional attempts to access the location or resource. In some embodiments, CAPTCHA program 114 determines whether the user is locked out based on, at least in part, security rules associated with the received request (see step 204). For example, the user may have exceeded the number of CAPTCHA failures defined by a security rule protecting the resource. In another example, the user's response may be indicative of an automated program rather than a human, such as in the previously described trap. If CAPTCHA program 114 determines that the user is locked out from additional attempts to access the location or resource (yes branch, decision 234), CAPTCHA program 114 initiates a lock out of the user (step 236). In some embodiments, CAPTCHA program 114 can lock out the user by preventing access to the location or resource, and documenting the requesting IP address, in order to prevent the documented IP address from making further attempts over a period of time, or indefinitely, based on a security level or rule associated with the location or resource.

If CAPTCHA program 114 determines that the user is not locked out (no branch, decision 234), then CAPTCHA program 114 allows the user to attempt another CAPTCHA challenge (step 204). Examples of criteria which allow a subsequent CAPTCHA attempt are, the user has not yet exceeded the number of CAPTCHA challenge failures as defined by a security rule protecting the resource or CAPTCHA program 114 cannot determine that the user is an automated program in response to analyzing the one or more prioritized accuracy comparisons.

In one embodiment, CAPTCHA program 114 reviews the stored data (see step 230) to determine if subsequent CAPTCHA challenges presented to the user have modified rules applied (step 204). Modified rules may include, for example, rules instructing CAPTCHA program 114 to incorporate more obfuscated characters within the CAPTCHA, acquire a more difficult CAPTCHA, or change one or more predetermined thresholds.

Figure 3:
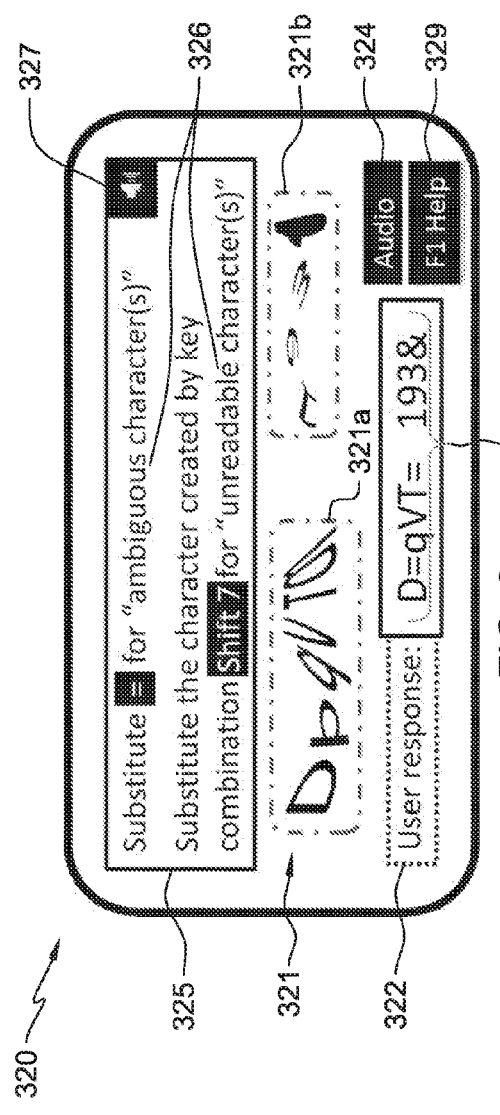
FIG. 3a depicts illustrative examples of potential CAPTCHA characters, in accordance with an embodiment of the present invention.
FIG. 3b is a table illustrating font types that generate symbols which are mapped to alphanumeric characters, in accordance with an embodiment of the present invention.
FIG. 3c depicts an example of a CAPTCHA, in accordance with an embodiment of the present invention.

FIGS. 3a and 3b depict illustrative examples of unaltered characters, which may be associated with different descriptors, in accordance with one embodiment of the invention. FIG. 3c depicts an example of CAPTCHA challenge 320, as created by CAPTCHA program 114 and presented to the user, in accordance with at least one embodiment of the current invention.

FIG. 3a depicts a non-inclusive set of example characters which may be assigned, for example, the descriptor of "ambiguous". In this example, "ambiguous characters" can be characters which appear as though they may each be two or more optionally selectable characters. In some embodiments, a plurality of characters may be assigned the descriptor of "ambiguous", for example, expanding the character library to other languages or acquiring characters or symbols which were specifically created by combining one or more characters. The characters are representative of symbols or characters which are not readily recreated on a standard keyboard without the use of a program, re-mapping a keyboard, or hot-key combination.

FIG. 3b depicts table 310. Table 310 depicts a non-inclusive array of characters from three different fonts. Row 311 includes a group of English language alphabetical characters as depicted by a common font. Row 312 and row 313 are each fonts of symbols and shapes in place of the alphabetic and other characters of the common font. Column 314a is an example of the English letter 'a' in the common font and represented by the equivalent character Alt Font #1 (see row 312) and Alt Font #2 (see row 313), respectively. Column 314b is an example of the English letter 'g' in the common font and represented by an equivalent in Alt Font #1 (see row 312) but Alt Font #2 (see row 313) does not contain a character equivalent to "g". The characters represented by Alt Font #1 and Alt Font #2, if incorporated into a CAPTCHA challenge for example, may be assigned the descriptor of "non-standard" in a substitute character message. In one embodiment, if the CAPTCHA image contained the Alt Font #1 and Alt Font #2 equivalents of the common font "a", a human's response may be the substitute character or a guess; whereas, an automated program may identify occurrences of the Alt Font #1 and Alt Font #2 equivalents of 'a' as 'a' and be "trapped" into exposing itself as an automated program.

FIG. 3c, CAPTCHA challenge 320, depicts an example of the output of CAPTCHA program 114 as presented to a user, in accordance with at least one embodiment of the current invention.

Image 321 is an illustrative example of a CAPTCHA challenge image created by CAPTCHA program 114, in accordance with one or more embodiments of this invention and is comprised of two distorted groups of images (image 321a, image 321b) separated by a gap (space/blank character). Image 321a is comprised of six characters, four standard characters and two obfuscated characters, assigned the descriptor "ambiguous". "Ambiguous" characters, in this example, appear as characters which are a combination of one or more characters or symbols. The second character of image 321a appears to be a combination of 'p' and 'b' whereas the sixth character appears to be a combination of 'o' and 'n'. Image 321b is comprised of four characters, three standard characters and one deliberately illegible character, which is assigned the descriptor 'unreadable'. The fourth character, for example, is "unreadable" because the width of the strokes creating the character are wide enough to eliminate any white space.

Button 324 may be selected by the user to activate an audio clip presentation of the characters within the CAPTCHA challenge image 321. Alphanumeric can be spoken within the audio clip while another sound may be presented for "ambiguous" character and a different sound presented as the "unreadable" character. For example, the audio clip association for "ambiguous" characters may be animal sounds and for "unreadable" characters the associated audio clip may be a monotone sound. An example of a CAPTCHA audio clip of such an embodiment is "capital-d 'lion's roar' small-q capital-V capital-T 'cat's meow'" followed by a pause to indicate a space then "one nine three 'B-flat tone'".

Substitute character message 325 is an illustrative depiction of a substitute character message formulated by CAPTCHA program 114, in accordance with an embodiment of the current invention. The substitute character message indicates, that in this embodiment, there are two types of obfuscated characters. The types of obfuscated characters are identified by character descriptors 326, in accordance with an embodiment of the current invention. One descriptor is "ambiguous", and the other descriptor is "unreadable". Substitute character message 325 defines for the user the character or keyboard combination necessary to create the character used to input each "ambiguous" or "unreadable" character. In the depicted example the substitute character(s) are shown as reverse tone text.

Button 327 is an example of a button selected by the user to activate the audio clip presentation of substitute character message 325. When button 327 is selected, the audio clip will read the substitute character message and substitute words or descriptions to aid the comprehension of the substitute character message. For example, '=' is presented as "the equals key", 'Shift 7' can be presented as "hold the shift key down while pressing the number seven along the top of the keyboard". This is an important distinction, using the '7' key on the numeric keypad creates a different result. The audio clip may be a single spoken description or it may be presented in a manner to allow the user to play/replay the audio clip for each substitute character or character descriptor separately.

Button 329 is an example of a "Help" button which the user may select to obtain more information for the depicted CAPTCHA challenge. One embodiment of this invention will provide further information about the implementation of the CAPTCHA challenge and the nature of the substitute character. Another embodiment will provide explanations of each of the character descriptors presented in the substitute character message. For example, selecting the button 329 opens a message defining "unreadable" characters as a character which is deliberately distorted beyond recognition or is an altered shape which was not based on a character and an "ambiguous" character can be defined as a character which appears as though it may be two or more optionally selectable characters.

User response area 322 includes a message and an input area. User's response 323 is "D=qVT=193&" and is the expected answer to the depicted CAPTCHA challenge image 321.

Figure 4:
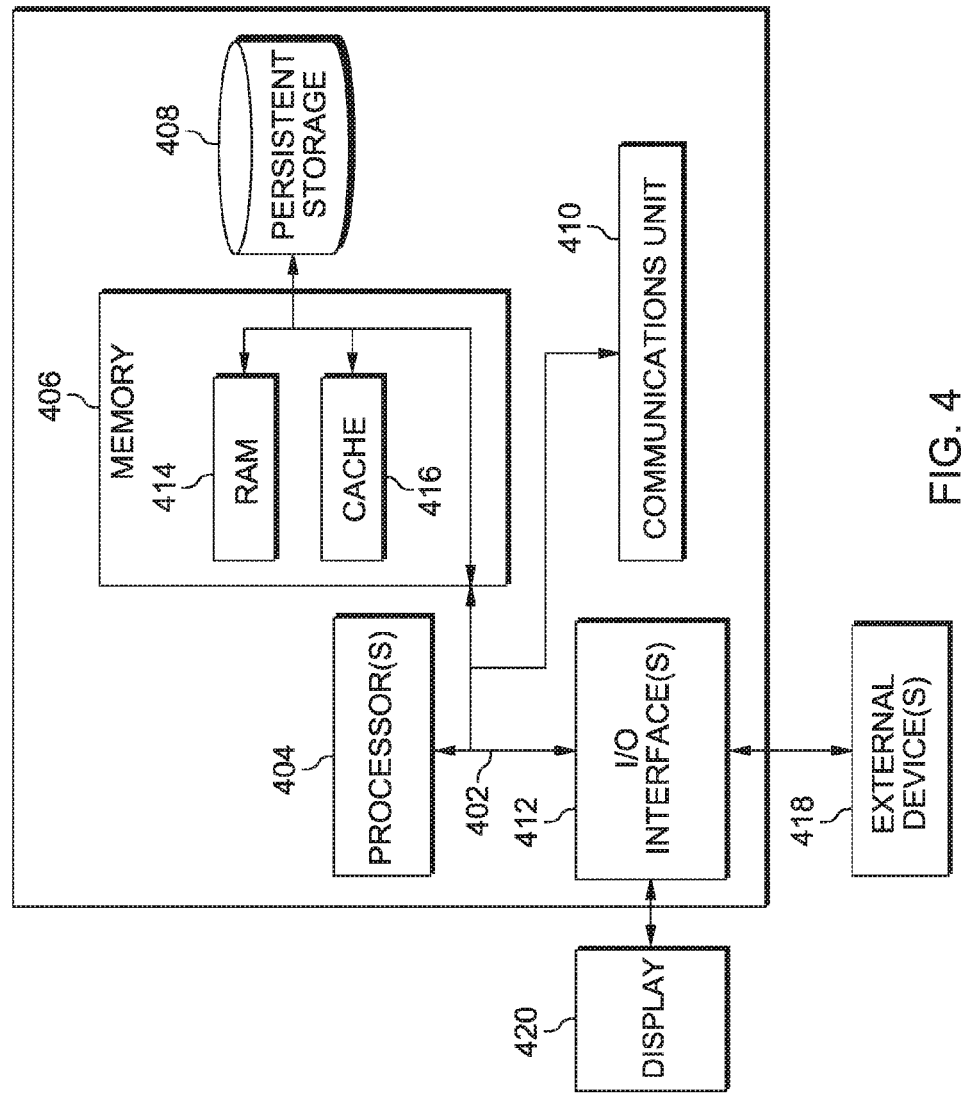
FIG. 4 is a block diagram of components of the servers and client computer of FIG. 1, in accordance with one embodiment of the present invention.

FIG. 4 depicts a block diagram of components of server 104, server 106, and client computer 110, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server 104, server 106, and client computer 110 each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

CAPTCHA program 114, user interface 116, user interface 112, and client program 120 are stored in respective persistent storage 408 for execution and/or access by one or more of the respective computer processor(s) 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including server 104, server 106, client computer 110, and data storage 108. In these examples, communications unit 410 includes one or more network interface cards. Communications unit 410 may provide communications through the use of either or both physical and wireless communications links. CAPTCHA program 114 and user interface 116, client application 120, and user interface 112 may be downloaded to respective persistent storage 408 through communications unit 410.

I/O interface(s) 412 allows for input and output of data with other devices that may be connected to server 104, server 106, and client computer 110, or data storage 108. For example, I/O interface(s) 412 may provide a connection to external device(s) 418 such as a keyboard, a keypad, a touch screen, and/or some other suitable input device. External device(s) 418 can also include portable computer readable storage media such as, for example, thumb drives, portable optical or magnetic disks, and memory cards. Software and data used to practice embodiments of the present invention, e.g., CAPTCHA program 114, user interface 116, client application 120, user interface 112, and can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention are presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The invention claimed is:

1. A method for determining if a user of a computer system is a human, the method comprising the steps of:

receiving, by one or more processors, an indication that a computer security program is needed, and in response, acquiring, by one or more processors, at least one image depicting a first string of characters including at least a first set of one or more characters, and a second set of one or more characters;

wherein each character of the first set of one or more characters is an alphanumeric character; and wherein each character of the second set of one or more characters is illegible;

assigning, by one or more processors, a first substitute character to be used as input for each of the second set of one or more characters, wherein the first substitute character is a different character than any of the second set of one or more characters;

presenting, by one or more processors, the at least one image, an indication of the first substitute character, and an indication of when to use the first substitute character to the user, wherein presenting the at least one image, an indication of the first substitute character, and an indication of when to use the first substitute character to the user comprises:

presenting, by one or more processors, the at least one image, a description of the first substitute character, and an indication of when to use the first substitute character to the use; and receiving, by one or more processors, a second string of characters from the user;

determining, by one or more processors, whether the second string of characters substantially matches, within a predetermined threshold, the first string of characters based on the first substitute character assigned to each of the second set of one or more characters, wherein the determination further comprises:

comparing, by one or more processors, each character of the second string of characters to a respective character within the first string of characters, according to character locations within each string of characters; and associating, by one or more processors, a weighting factor to each character of the second string of characters based on the comparison and the set of one or more characters within which the respective character of the first string of characters is a member; and determining, by one or more processors, that the second string of characters substantially matches, within a second predetermined threshold, the first string of characters, based on the weighting factor associated with each character within the second string of characters, and responsive to determining that the second string of characters substantially matches, within a second predetermined threshold, the first string of characters, based on the weighting factor associated with each character within the second string of characters, determining, by one or more processors, that the user of the computer system is a human.

\* \* \* \* \*